United States Patent [19]

VanZandt

[11] 4,358,872

[45] Nov. 16, 1982

[54] APPARATUS FOR TENDERIZING MEAT

[76] Inventor: Mordecai M. VanZandt, 11809 Stonington Pl., Silver Spring, Md. 20902

[21] Appl. No.: 222,922

[22] Filed: Jan. 6, 1981

[51] Int. Cl.³ .......................... A22B 5/00; A22C 9/00
[52] U.S. Cl. ...................................... 17/1 R; 17/1 E; 17/25
[58] Field of Search ...................... 17/1 E, 25, 45, 1 R

[56] References Cited

U.S. PATENT DOCUMENTS

| | | | |
|---|---|---|---|
| 1,553,135 | 9/1925 | Byrnes | 17/1 E |
| 2,200,405 | 5/1940 | Watson et al. | 17/25 UX |
| 2,544,681 | 3/1951 | Harsham et al. | 17/25 UX |
| 2,544,724 | 3/1951 | Rentschler | 17/25 UX |
| 3,167,809 | 2/1965 | Rollins | 17/1 E |
| 3,258,811 | 7/1966 | Braun | 17/1 E |
| 4,221,021 | 9/1980 | Swilley | 17/1 E |

FOREIGN PATENT DOCUMENTS 712068  2/1980  U.S.S.R. .................................. 17/25

OTHER PUBLICATIONS

Koch—"Beef Carcass Stimulator", *The National Provisioner*, Sep. 1, 1979, p. 25.

*Primary Examiner*—Willie G. Abercrombie
*Attorney, Agent, or Firm*—Ira C. Edell

[57] ABSTRACT

An improved method and apparatus for tenderizing beef by electrical stimulation is characterized by a rectal electrode having a tubular stainless steel shaft with a solid brass tip at one end and an insulative handle at the other end. An insulative post is connected to the handle at an angle to facilitate probe deployment when the carcass is suspended from a hind leg. The applied electrical stimulation is applied for approximately one minute in the form of a series of low voltage pulses, on the order of twenty volts, having a repetition rate of thirty pulses per minute with a fifty percent duty cycle. The probe is inserted and power applied immediately after the carcass is hoisted on the bleeding rail and bled in order to maximize the effect of the applied energy.

12 Claims, 5 Drawing Figures

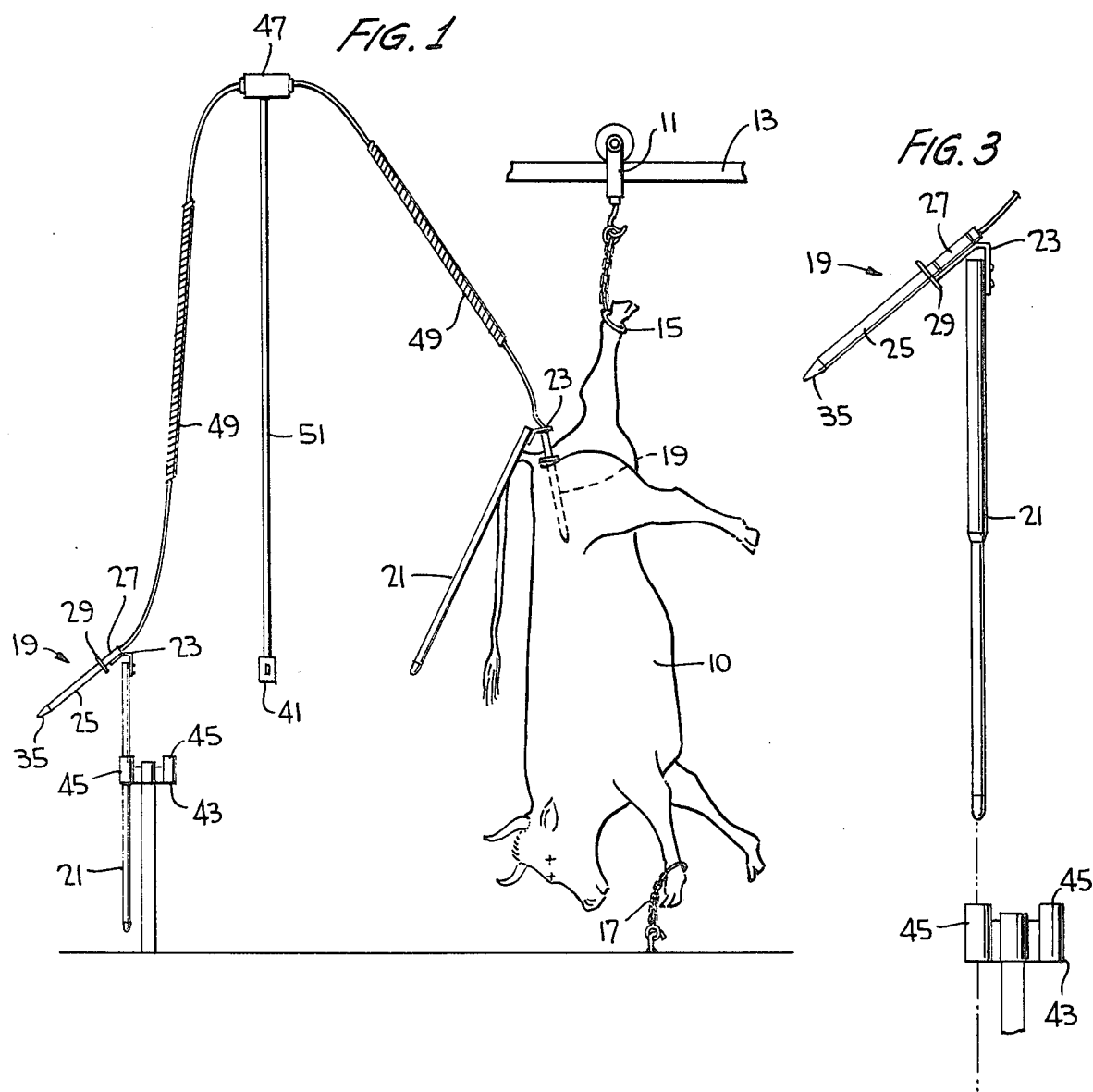
FIG. 1
FIG. 3
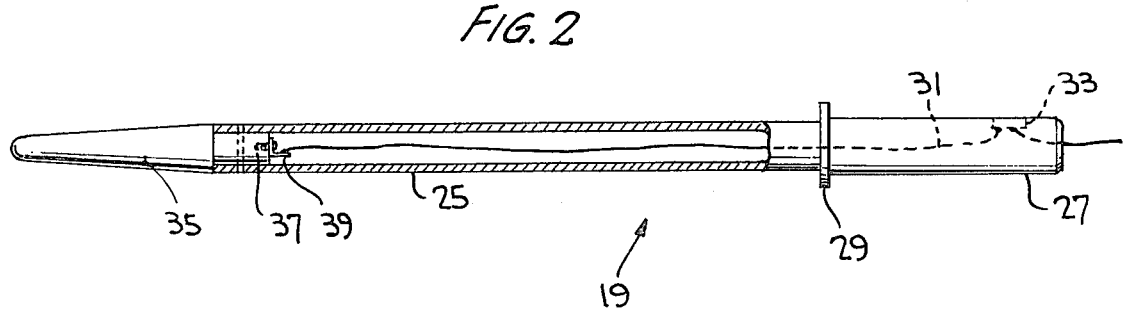
FIG. 2

APPARATUS FOR TENDERIZING MEAT

TECHNICAL FIELD

The present invention relates an improved method and apparatus for tenderizing beef and, more particularly, to the use of electrical stimulation in order to effect tenderizing.

BACKGROUND OF THE INVENTION

The use of electrical stimulation of a carcass to expedite tenderizing is well known as evidenced by U.S. Pat. No. 2,544,681 to Harsham et al. It is recognized in that patent electrical stimulation results in an accelerated postmortem drop in the pH of the animal tissue and that this accelerated pH drop is beneficial to beef tenderness. Subsequent work in the field has shown that electrical stimulation of muscle rapidly depletes adenosine triphosphate (ATP) from the muscle. This chemical is necessary for muscle contraction to take place. Chilling of muscle (which is a common procedure in the meat packing industry) while the ATP level is still high results in a contraction or shortening of the muscle which produces an undesirable toughness. Depletion of ATP before chilling by means of electrical stimulation prevents or considerably reduces contraction and provides for much more tender beef.

It is generally accepted that the earlier the voltage stimulation is applied to the carcass after slaughter, the more effective is the stimulation in producing tenderness. However, there is wide disagreement in other respects, such as the level of the applied voltage, the manner in which it is applied, the body parts to which it is applied, the repetition rate of applied pulses, etc. Broadly speaking, there are three alternative techniques which have received some degree of acceptance in the meat packing industry. In a first of these techniques the carcass, after being suspended from the bleeding rack and bled, is transported along a path wherein the carcass makes rubbing contact with an electrified rail, the contact being generally at the shoulder region. The return path for current is through support hooks deployed in the Achilles tendon of one or both hind legs. Peak voltages on the order of one thousand volts are used and, in fact, are necessary to overcome the high contact resistance provided by the moving rubbing contact of the carcass along the rail. Such high voltages require carefully designed safety procedures and equipment which add to the expense and complexity of the system. Further, the suspended carcass may jerk spasmodically away from the contact rail, breaking contact and causing additional danger to personnel. Other disadvantages of this system include damage to the hide or marking of the carcass due to resistive heating at the contact rail.

A second system uses two roller hooks connected to the two hind legs so that current flows down one leg and up the other. High voltages are also necessary in this system in order to overcome the resistance of the two hind legs and Achilles tendons. The resulting need for personnel safety procedures and equipment renders this system expensive. In addition, there is some question as to whether this system is efficient in tenderizing all usable parts of the carcass.

Both of the systems described above require a length of rail in the middle of the dressing line which is long enough to permit entry and exit plus stimulation for a duration on the order of ninety seconds. In order to adopt such a system, considerable alterations are required in the packing plant.

A third system, which requires minimal alteration in an existing plant, employs a rectal probe which is manually inserted. The applied electrical stimulation takes the form of a series of low voltage pulses having a repetition rate of forty pulses per second and is applied for ninety seconds. This method avoids the safety problems inherent in the use of high voltage and is particularly effective, although the reason for the effectiveness has not heretofore been fully understood. It has a disadvantage in that the probe must be inserted before the animal is hoisted and bled rather than at a more desirable location along the line. In addition, the probe employed includes a pair of electrodes in the form of bent wires which are orthogonally positioned in crossing planes. Insertion, cleaning, and, most importantly, effectiveness as an electrode are poor at best.

SUMMARY OF THE INVENTION

It is a primary object of the present invention to improve the technique of electrical stimulation of beef carcasses whereby to avoid the aforementioned disadvantages of the prior techniques.

I have found that a properly configured electrode probe, when inserted into the rectum of an animal immediately after it is bled, makes excellent electrical contact with the moist fecal material in the intestines. This material is a combination of acids, metals, and salts which conduct the applied electrical pulses via the still active nervous system through the carcass. In order to optimize the contact with the slurry of fecal material, I employ a probe comprising a two-part metal electrode in the form of a hollow tube from which extends a solid tip. In the preferred embodiment the tube is made of stainless steel and the tip is made of brass. An insulative handle surrounds a portion of the tube and a current-carrying wire extends through the tube and contacts the tip. In order to facilitate deployment of the probe when an animal is suspended by its hind legs I employ a post to which the probe handle is secured at one end at an acute angle to the post.

I have also found that extra low voltage (ELV) on the order of twenty volts can be applied at a repetition rate of thirty pulses per minute for one minute with exceptional success in achieving tenderizing.

In the preferred embodiment, the circuitry for providing the electrical pulses is housed in a wall mounted circuit box capable of delivering pulses to either of two separate probes. The probes, supported on respective posts, are stored in a wall-mounted rack near the circuit box.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein:

FIG. 1 is a diagrammatic view of a beef carcass being stimulated by the apparatus of the present invention;

FIG. 2 is a view in plan and partial section of the probe employed in the present invention;

FIG. 3 is a view in plan of the probe of FIG. 2 supported on a post and of a rack for receiving the post;

DESCRIPTION OF THE PREFERRED EMBODIMENTS

Figure 4:
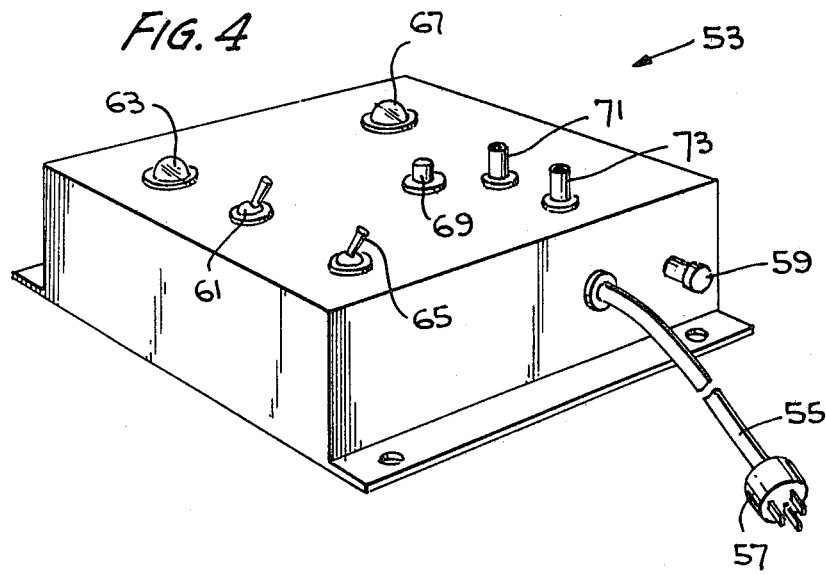
FIG. 4 is a view in perspective of a circuit box for housing the electrical circuit employed in the present invention.

Referring to the drawings in greater detail, FIGS. 1-3 in particular, a beef carcass 10 is shown suspended from a trolley 11 which is movable along a rail 13. A shackle 15 is secured to one of the hind legs and to trolley 11 to effect the desired suspension. Generally, the animal is suspended with its nose approximately six inches above the ground. Shackle 15, trolley 11 and rail 13 are all at ground potential. A front leg of the carcass may be shackled to the floor at 17, if desired, to preclude movement of the carcass during application of electrical stimulation.

A probe 19 is supported at one end of a post 21 by means of a bracket 23 or other suitable means. Probe 19 includes a hollow metal tube 25 over one end of which is inserted an insulating handle 27 of rubber, plastic, or the like. Handle 27 is open at one end to receive tube 25 and, surrounding that opening, includes an annular flange 29 which serves as a limit stop when the probe is inserted into the rectal opening of carcass 10. An electrical conductor such as where 31 extends through a suitable provided opening at the other end of handle 27 to contact a terminal 33 defined internally of and in electrical contact with tube 25. Wire 31 additionally extends through tube 25 to its distal end.

At the distal end of tube 25 there is secured a solid metal tip 35 in electrical contact with the tube. Tip 35 includes a solid cylindrical section 37 of reduced diameter at one end which is received in the distal end of the tube. One or more through holes in the tube 25 and section 37 are aligned to receive radially-extending screws, rivets, or the like which fixedly secure the tip 35 to the tube. The extreme end of section 37 of the tip has a terminal 39 secured thereto for connection to the end of electrical wire 31. The distal end of tube 25 abuts an annular shoulder of probe 35 which demarks the juncture of section 37 and the exposed part of the probe. Probe 35 tapers in a converging manner toward its distal end to facilitate insertion into the rectum of carcass 10.

Tube 25 is preferably made of stainless steel, although other conductive metals will serve the purpose. Solid tip 35 is preferably made of brass although this too should not be considered a limiting feature of the invention. Post 21 is preferably made of wood, plastic or other insulating material although a metal may be used for the post in view of the fact that it is not connected to metal parts of the probe.

A control box 41 is mounted on a nearby wall along with a rack 43 for supporting a pair of posts 21. Rack 43 includes a pair of cylindrical sleeves 45 which are vertically oriented. Post 21 includes a small diameter section and a large diameter section, with the small diameter section being insertible into sleeve 45 from the top of the sleeve. Control box 41 contains the controls for the electrical stimulation circuit, the circuit itself being housed in a circuit box 47 mounted on the wall at a location considerably above control box 41. Retractable insulated line cords 49 contain conductor 31 and extend from circuit box 49 to respective probes 19. A conduit 51 extends along the wall between circuit box 49 and control box 41 and carries the necessary interconnections between these boxes.

Rather than provide separate control and circuit boxes, all of the controls and circuitry may be incorporated in a single housing 53 illustrated in FIG 4. Housing 53 is a rectangular box which includes a power cord 55 terminating in a conventional AC plug 57. A fuse 59 is also accessibly mounted on the housing. Other visibly mounted controls include power on switch 61, power on lamp 63, output probe selector switch 45, pulser on lamp 67, pulser on push button switch 69, and power jacks 71 and 73 to connect to respective cords 49.

Figure 5:
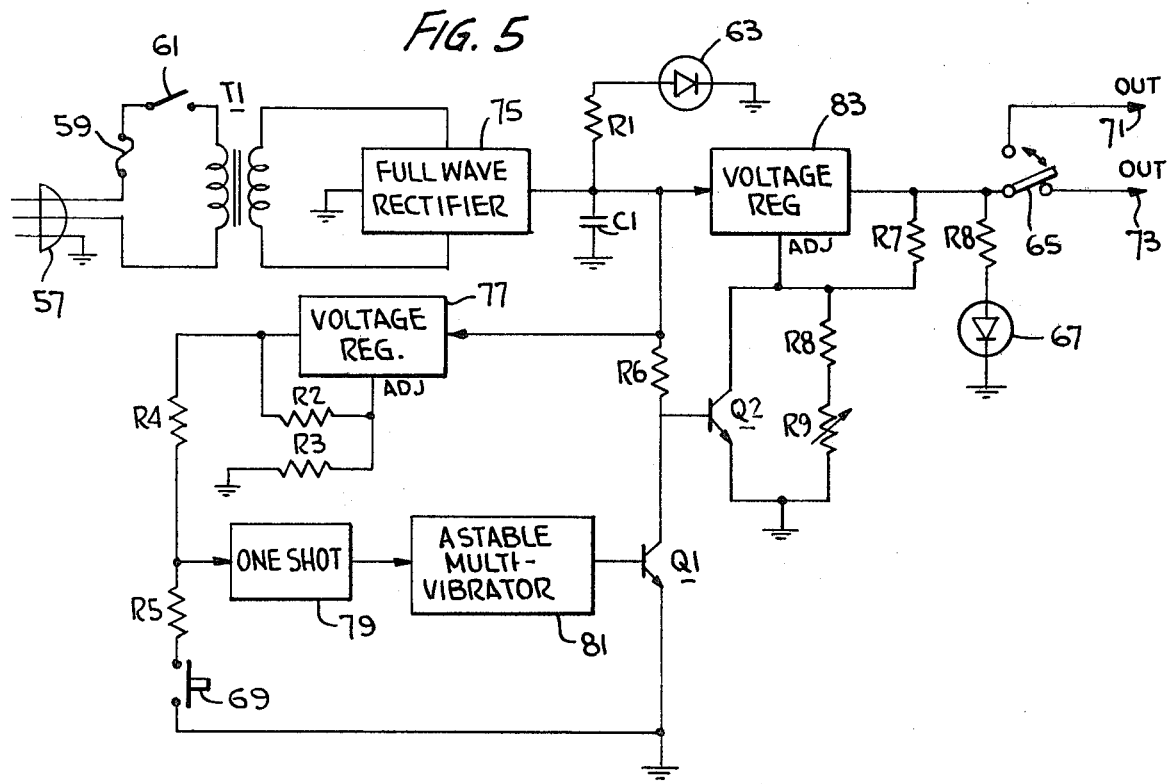
FIG. 5 is a schematic diagram of the electrical circuit employed in the present invention.

The circuit housed in housing 53 or boxes 41 and 49 is illustrated in FIG. 5. The power supply portion of the circuit includes a step-down transformer T1 having its primary connected in series with power on switch 61, fuse 59 and the 115 volts, 60 Hz primary power source provided at plug 57. The secondary winding of transformer T1 is connected across a conventional full wave rectifier circuit 75 which converts the stepped down AC voltage delivered across the secondary transformer winding to a DC voltage. A capacitor C1 is connected between the output of rectifier circuit 25 and ground to provide filtering of the DC voltage. A voltage dropping resistor R1 and power on lamp 63 are connected in series across capacitor C1.

The filtered DC voltage is applied to a voltage regulator 77 from the output of which a resistive voltage divider is connected to ground. This voltage divider includes resistors R2 and R3 which are selected to control the output voltage level of the regulator. Another path to ground from the output of regulator 77 includes resistors R4 and R5 connected in series with pulser push button switch 69. The function between resistors R4 and R5 is connected to the trigger input terminal of a one-shot multivibrator 79 which delivers its output pulse to the enabling input terminal of an astable multivibrator 81. More particularly, one-shot multivibrator 79 provides an output pulse of substantially one minute duration when triggered. For the duration of this pulse, astable multivibrator 81 provides a train of output pulses having a thirty pulse per minute repetition rate and having a fifty percent duty cycle.

The output pulses from astable multivibrator 81 are applied to the base of NPN transistor Q1. The collector of transistor Q1 is resistively coupled to the output of full wane rectifier 75 via resistor R6. The emitter of transistor Q1 is connected to ground. The collector of transistor Q1 is also connected to the base of NPN transistor Q2 which has its emitted grounded and its collector resistively coupled, via resistor R7, to the output terminal of another voltage regulator 83. The input terminal of regulator 83 is connected to the output terminal of the full wane rectifier circuit 75. The series combination of resistor R8 and vanable resistor R9 is connected across the collector-emitter circuit of transistor Q2 and also between the adjustment control of regulator 83 and ground. The value of resistor R9 can therefore be adjusted to control the output voltage level from regulator 83. The series combination of resistor R8 and pulser lamp 67 is connected between the output terminal of regulator 83 and ground. Probe selector switch 65 has its arm connected to the output of regulator 83 and its contacts connected to respective output jacks 71 and 73.

In operation, the circuit of FIG. 5 is activated when power on switch 61 is closed causing a DC voltage from rectifier circuit 75 to energize lamp 63 and energize regulators 77 and 83. Prior to actuation of pulser switch 69 transistor Q2 is conductive and effectively shorts the output of regulator 83 to ground through low value resistor R7. Transistor Q1 is non-conducting at this time.

Upon actuation (i.e. closure) of push-button switch 69, one-shot multivibrator is energized to provide an output pulse of one minute duration which activates astable multivibrator 81 for that interval. The pulses from astable multivibrator 81, appearing at a thirty pulse per minute rate, trigger transistor Q1 on and off at the same rate. When transistor Q1 is conductive transistor Q2 is rendered non-conductive, permitting the output voltage from regulator 83 to be applied to the output jack 71 or 73 selected by switch 65. Referring back to FIG. 1, the pulses appearing at the selected output jack are applied via cord 49 to probe 19 to electrically stimulate the carcass 10.

Still referring to FIG. 1, after the animal 10 is shackled and hoisted, so that its nose is approximately six inches above the floor, the animal's throat is cut while the head is held back by the operator. The tail is then held to avoid injury to the operator due to reflexive movement and the probe is inserted into the rectum. The animal is then bled and power is applied to the probe. The two probes permit one carcass to be stimulated while another carcass is being prepared by having the probe inserted. This procedure, as described herein has been approved for kosher slaughtering.

I have found that the pulse repetition rate (30 ppm), duty cycle (50%) and voltage level (approximately 20 volts) employed herein provide for efficient tenderizing of meat by efficiently depleting ATP from the carcass. These parameters permit complete relaxation of the muscles between pulses which apparently is important in effecting ATP depletion.

I have also found that the particular probe structure, using a solid conductive tip 35 while having the advantage of a reduced mass and weight in the hollow tube 25, is particularly efficient in applying the low voltage pulses to the carcass. The pulsed solid tip 35, when inserted into the fecal slurry, produces an electrochemical reaction which assures that the low voltage pulses reach the nearby spine and pass through the nervous system to be distributed efficiently to all of the muscles in the animal. This efficiency is achieved without the use of high voltage and its inherent safety problems. In addition, no probes are inserted into the flesh so that the meat is not damaged thereby.

In the preferred embodiment, and by way of example only, the probe 19 is 18½ inches long, wherein the length of the tip 35 is 3 inches and the tube 25 is 15½ inches. The handle in this embodiment is 5 inches long, leaving 13½ inches of probe forward of flange 29 for insertion into the carcass. This length is ideal in an adult carcass for assuring contact between tip 35 and the fecal slurry. Post 21, in this embodiment is four feet long and the angle between the post and probe is approximately 40°. This angle has been found to be quite desirable in facilitating full rectal deployment of the probe in a suspended carcass. Bracket 23 is preferably made of steel but can be made of other materials. Rack 43 is preferably made of stainless steel but likewise may be made of other materials. Rectractable cord 49 preferably extends to a length of twelve feet.

As noted above, the stimulation is preferably applied as soon as possible after bleeding of the carcass is initiated. Preferably, stimulation should begin no more than three to five minutes after the jugular vein is severed; such timing helps the pumping of blood from the carcass while depleting ATP as necessary for tenderizing.

While I have described and illustrated specific embodiments of my invention, it will be clear that variations of details of construction which are specifically illustrated and described may be resorted to without departing from the true spirit and scope of the invention as defined in the appended claims.

I claim:

1. A rectal probe for use in tenderizing a meat carcass comprising:
   a hollow metal tube having first and second ends;
   a solid tip of electrically conductive metal secured to and coaxially projecting from said first end of said tube, said tip having a convergingly tapered forward end, remote from said first end, and suitable for insertion into the rectum of said carcass; and
   electrical conductor means extending through said tube into contact with said tip for applying voltage to said tip;
   wherein said solid tip and said metal tube are made of two different metals.

2. The probe according to claim 1, further comprising flange means projecting radially from said tube for limiting the length of tube which can be inserted into the rectum of a carcass.

3. The probe according to claim 2, wherein said flange means is part of an insulative handle disposed concentrically about said tube proximate said second end.

4. The probe according to claim 1, wherein said tip is made of brass and said tube is made of stainless steel.

5. The probe according to claims 1 or 4, further comprising an elongated post secured to said probe proximate said second end by said tube, said probe subtending an acute angle with said post.

6. The probe according to claim 5, wherein said acute angle is approximately 40°.

7. The probe according to claim 5, wherein said post is made of electrically insulative material.

8. The probe according to claim 5, wherein said post is secured to said probe by means of a bracket.

9. Apparatus for use in electrically stimulating a beef carcass to effect tenderizing of the beef, said apparatus comprising:
   an elongated probe having first and second ends and including a conductive metal electrode at said first end; and
   an elongated post having one end secured to said probe proximate said second end and forming an acute angle with said probe.

10. The apparatus according to claim 9, wherein said acute angle is approximately 40°.

11. The apparatus according to claims 9 or 10, wherein said post is made of electrically insulative material and is secured to said probe by means of a bracket.

12. The apparatus according to claim 10 wherein said probe comprises a solid metal tip disposed at said first end and a hollow metal tube secured to said tip, wherein said tube and said tip are made of different electrically-conductive metals, said probe further comprising a means disposed within said hollow tube for applying electrical voltage to said tip.

* * * * *